(12) United States Patent
Zhang et al.

(10) Patent No.: US 7,906,057 B2
(45) Date of Patent: Mar. 15, 2011

(54) NANOSTRUCTURED ARTICLE AND METHOD OF MAKING THE SAME

(75) Inventors: Haiyan Zhang, Woodbury, MN (US);
Evariste F. Osten, Woodbury, MN (US);
Gary A. Korba, Oakdale, MN (US);
George G. I. Moore, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 502 days.

(21) Appl. No.: 11/181,153

(22) Filed: Jul. 14, 2005

(65) Prior Publication Data

US 2007/0013103 A1 Jan. 18, 2007

(51) Int. Cl.
*B29D 7/00* (2006.01)
*B29C 47/88* (2006.01)
*D04H 1/06* (2006.01)
*D04H 1/00* (2006.01)
*B32B 7/02* (2006.01)

(52) U.S. Cl. .......... 264/284; 264/211.14; 264/212; 28/103; 428/213; 428/292.1; 442/327; 442/334

(58) Field of Classification Search .......... 264/212, 264/211.14, 211.4, 284; 28/103; 428/213, 428/292.1; 442/327, 334
See application file for complete search history.

(56) References Cited

U.S. PATENT DOCUMENTS

| | | |
|---|---|---|
| 3,927,692 A | 12/1975 | Wenrich |
| 4,674,878 A | 6/1987 | Vo-Dinh |
| 4,781,952 A | 11/1988 | Coscia et al. |
| 5,025,052 A | 6/1991 | Crater et al. |
| 5,039,561 A | 8/1991 | Debe |
| 5,099,026 A | 3/1992 | Crater et al. |
| 5,244,951 A | 9/1993 | Gardiner |
| 5,300,263 A | 4/1994 | Hoopman et al. |
| 5,300,357 A | 4/1994 | Gardiner |
| 5,380,778 A | 1/1995 | Buckanin |
| 5,451,622 A | 9/1995 | Boardman et al. |
| 5,521,030 A | 5/1996 | McGrew |

(Continued)

FOREIGN PATENT DOCUMENTS

CN 1445385 A 10/2003

(Continued)

OTHER PUBLICATIONS

Hulteen et al., "Surface-Enhanced Spectroscopic Method, Flexible Structured Substrate, and Method of Making the Same", U.S. Appl. No. 11/181,151, filed Jul. 14, 2005.

(Continued)

*Primary Examiner* — Christina Johnson
*Assistant Examiner* — Michael T Piery
(74) *Attorney, Agent, or Firm* — Bradford B. Wright

(57) ABSTRACT

A method of making nanostructured polymeric film includes: providing a tool having a porous anodized aluminum surface or a metallic replica thereof, wherein the average depth of the pores and the average pore width fall with specified ranges; forming a continuous layer of thermoplastic polymer selected from cellulose esters, poly alpha-olefins, and combinations thereof on at least a portion of the surface of the tool such that the continuous layer extends into the pores of the surface; separating the continuous layer from the tool as a film having nanofibrils formed on a major surface of the tool, the surface of the tool having a fluorocarbon release agent thereon, or the continuous layer comprising a fluorocarbon melt additive, or both. Nanostructured films are also disclosed.

8 Claims, 3 Drawing Sheets

U.S. PATENT DOCUMENTS

| | | | |
|---|---|---|---|
| 5,659,408 | A | 8/1997 | Wenyon |
| 5,674,592 | A | 10/1997 | Clark et al. |
| 5,751,415 | A | 5/1998 | Smith et al. |
| 5,792,411 | A | 8/1998 | Morris et al. |
| 5,804,625 | A | 9/1998 | Temperante et al. |
| 5,882,762 | A | 3/1999 | Goeman |
| 5,930,040 | A | 7/1999 | Janovec et al. |
| 6,076,248 | A | 6/2000 | Hoopman et al. |
| 6,127,485 | A | 10/2000 | Klun et al. |
| 6,174,964 | B1 | 1/2001 | Jariwala et al. |
| 6,190,594 | B1 | 2/2001 | Gorman et al. |
| 6,262,180 | B1 | 7/2001 | Klun et al. |
| 6,284,843 | B1 | 9/2001 | Jariwala et al. |
| 6,288,157 | B1 | 9/2001 | Jariwala et al. |
| 6,368,534 | B1 | 4/2002 | Nakamura et al. |
| 6,376,065 | B1 | 4/2002 | Korba et al. |
| 6,380,289 | B1 | 4/2002 | Thompson, Jr. et al. |
| 6,391,807 | B1 | 5/2002 | Jariwala et al. |
| 6,489,377 | B1 | 12/2002 | Bicer et al. |
| 6,514,597 | B1 | 2/2003 | Strobel et al. |
| 6,527,991 | B1 | 3/2003 | Bakker et al. |
| 6,576,887 | B2 | 6/2003 | Watson et al. |
| 6,586,522 | B1 | 7/2003 | Jariwala et al. |
| 6,592,988 | B1 * | 7/2003 | Thompson et al. ........... 428/375 |
| 6,622,599 | B1 | 9/2003 | Ben-Menachem et al. |
| 6,641,767 | B2 | 11/2003 | Zhang et al. |
| 6,646,019 | B2 | 11/2003 | Perez et al. |
| 6,649,249 | B1 | 11/2003 | Engle et al. |
| 6,737,160 | B1 | 5/2004 | Full et al. |
| 6,823,653 | B1 | 11/2004 | Stark et al. |
| 6,824,378 | B2 | 11/2004 | King et al. |
| 6,877,216 | B2 | 4/2005 | Fukuda et al. |
| 2002/0084553 | A1 | 7/2002 | Nun et al. |
| 2002/0130441 | A1 | 9/2002 | Robinson et al. |
| 2003/0068481 | A1 | 4/2003 | Kody et al. |
| 2003/0155246 | A1 | 8/2003 | Schimmel et al. |
| 2003/0157347 | A1 | 8/2003 | Zhang et al. |
| 2003/0187170 | A1 | 10/2003 | Burmeister |
| 2004/0043146 | A1 | 3/2004 | Pellerite et al. |
| 2004/0094705 | A1 | 5/2004 | Wood et al. |
| 2005/0136608 | A1 | 6/2005 | Mosley |
| 2006/0138686 | A1 | 6/2006 | Ouderkirk et al. |
| 2006/0138694 | A1 | 6/2006 | Biernath et al. |
| 2006/0138705 | A1 | 6/2006 | Korba et al. |
| 2006/0141218 | A1 | 6/2006 | Biernath et al. |
| 2006/0141219 | A1 | 6/2006 | Benson et al. |
| 2006/0141220 | A1 | 6/2006 | Merrill et al. |
| 2006/0204720 | A1 | 9/2006 | Biernath et al. |

FOREIGN PATENT DOCUMENTS

| | | |
|---|---|---|
| DE | 100 64 520 A1 | 7/2002 |
| JP | 5-25696 | 2/1993 |
| WO | WO 91/02228 | 2/1991 |
| WO | WO 00/73082 A1 | 12/2000 |
| WO | WO 01/88575 A2 | 11/2001 |
| WO | WO 2006098935 A1 * | 9/2006 |

OTHER PUBLICATIONS

Frey et al., "Microfabrication Using Patterned Topography and Self-Assembled Monolayers", U.S Appl. No. 11/003,233, filed Dec. 3, 2004.

Zhang, "Tool and Method of Making and Using the Same", U.S. Appl. No. 11/181,150, filed Jul. 14, 2005.

Foss et al., "Optical Properties of Composite Membranes Containing Arrays of Nanoscopic Gold Cylinders", J. Phys. Chem.1992, vol. 96, pp. 7497-7499.

Masuda et al., "Fabrication of Pt microporous electrodes from anodic porous alumina and immobilization of GOD into their micropores", Journal of Electroanalytical Chemistry, 1994, vol. 368, pp. 333-336.

Martin, "Nanomaterials: A Membrane-Based Synthetic Approach", Science, Dec. 23, 1994, vol. 266, pp. 1961-1966.

Chou et al., "Nanoimprint Lithography", Nov./Dec. 1996, J. Vac. Sci. Technol. B., vol. 14, No. 6, pp. 4129-4133.

Chou et al., "Imprint Lithography with 25-Nanometer Resolution", Science, Apr. 5, 1996, vol. 272, pp. 85-87.

Chou et al., "Imprint of sub-25 nm vias and trenches in polymers", Appl Phys. Lett., Nov. 20, 1995, vol. 67, No. 21, pp. 3114-3116.

Chou et al., "Sub-10 nm imprint lithography and applications", Nov./Dec. 1997, J. Vac. Sci. Technol. B., vol. 15, No. 6, pp. 2897-2904.

Hoyer, "Semiconductor Nanotube Formation by a Two-Step Template Process", Advanced Materials, 1996, vol. 8, No. 10, pp. 857-859.

Yao et al., "A complimentary study of surface-enhanced Raman scattering and metal nanrod arrays", 2000, Pure Appl. Chem. vol. 72, No. 1, pp. 221-228.

Bonn et al., "Theory of sum-frequency generation spectroscopy of absorbed molecules using the density matrix method—broadband vibrational sum-frequency generation and applications", 2005, J. Phys.: Condens. Matter, vol. 17, pp. S201-S220.

Schatz et al., "Electromagnetic Mechanism of Surface-enhanced Spectroscopy", from "Handbook of Vibrational Spectroscopy", J. M. Chalmers, and P.R. Griffiths (Editors), John Wiley & Sons Ltd. Chichester, England, 2002, pp. 1-16.

Zhang et al., "Rapid Detection of an Anthrax Biomarker by Surface-Enhanced Raman Spectroscopy", Published on Web Mar. 8, 2005, J. Am. Chem. Soc., vol. 127, No. 12, pp. 4484-4489.

Foss et al., "Optical Properties of Composite Membranes Containing Arrays of Nanoscopic Gold Cylinders", 1992, J. Phys. Chem., vol. 96, No. 19, pp. 7497-7499.

Dick, et al., "Metal Film over Nanosphere (MFON) Electrodes for Surface-Enhanced Raman Spectroscopy (SERS): Improvements in Surface Nanostructure Stability and Suppression of Irreversible Loss", 2002, Published on the Web Dec. 27, 2001, J. Phys. Chem.B., vol. 106, No. 4, pp. 853-860.

Haisma et al., "Mold-assisted nanolithography: A process for reliable pattern replication", Nov./Dec. 1996, J. Vac. Sci. Technol. B., vol. 14, No. 6, pp. 4124-4128.

Hulteen et al., "Nanosphere lithography: A materials general fabrication process for periodic particle array surfaces", May/Jun. 1995, J. Vac. Sci. Technol. A., vol. 13, No. 3, pp. 1553-1558.

Kahl et al., "Periodically structured metallic substrates for SERS", 1998, Sensors and Actuators B, vol. 51, pp. 285-291.

Nie et al., "Probing Single Molecules and Single Nanoparticles by Surface-Enhanced Raman Scattering", Feb. 21, 1997, Science, vol. 275, No. 21, pp. 1102-1106.

Fleischmann et al., "Raman Spectra of Pyridine Absorbed at a Silver Electrode", May 15, 1974, Chemical Physics Letters, vol. 26, No. 2, pp. 163-166.

Young et al., "Surface enhanced Raman spectroscopy with a laser pointer light source and miniature spectrometer", 2004, Can. J. Chem., vol. 82, pp. 1435-1441.

Vo-Dinh et al., "Recent advances in surface-enhanced Raman spectrometry for chemical analysis", 1988, Spectrochimica Acta, vol. 43B, Nos. 4/5, pp. 605-615.

Goudonnet et al., "Surface-Enhanced Raman Scattering on Silver-Coated Teflon Sphere Substrates", Oct. 15, 1982, Chemical Physics Letters, vol. 92, No. 2, pp. 197-201.

Schafer-Peltier, "Toward a Glucose Biosensor Based on Surface-Enhanced Raman Scattering", 2003, J. Am Chem. Soc., vol. 125, pp. 588-593.

Viets et al., "8. Fiber-optic SERS sensors", [retrieved from the Internet on Jun. 8, 2005], The Internet Journal of Vibrational Spectroscopy, vol. 4, Edition 2, <http://www.ivjs.com/volume4/edition2/section7.html>, 13 pages.

"Aluminum Finishes Process Manual", Reynolds Metal Company, Richmond, Virginia, 1973, pp. 62-113.

Proceedings of Symposium "Defect Structure Morphology and Properties of Deposits—Surface Morpholgy of Electrodeposits", Rosemont, Illinois, Oct. 4-6, 1994, The Minerals, Metals and Materials Society, pp. 114-167.

Pinner, "Copper and Alloy Plating", Copper Development Association, London, C.D.A. Publication No. 62, 1962, Second Ed., 1964, pp. 3, 26-41, 72-77.

Kahl, "Periodische Nanostructuren für die oberflächenverstärkte Raman-Streuung (SERS)" VDI Verlog, Düsseldorf, 2001, pp. 23-39.

* cited by examiner

NANOSTRUCTURED ARTICLE AND METHOD OF MAKING THE SAME

BACKGROUND

Surface nanostructures have attracted much attention because they provide unique properties for many potential applications. For example, in some cases surface nanostructure can dramatically change the apparent surface energy, which is particularly useful in articles wherein fluid control would be either essential or advantageous.

Surface nanostructures also considerably increase surface area, which is typically important in such areas as making catalysts and sensors.

SUMMARY

In one aspect, the present invention provides a method of making nanostructured polymeric film comprising:

providing a tool having a porous anodized aluminum surface or a metallic replica thereof, wherein the average depth of the pores is in a range of from about 0.1 micrometer to about 5 micrometers and the average pore width is in a range of from about 10 to about 500 nanometers;

forming a continuous layer of thermoplastic polymer on at least a portion of the surface of the tool such that the continuous layer extends into the pores of the surface, wherein the thermoplastic polymer is selected from cellulose esters, poly alpha-olefins, and combinations thereof; and separating the continuous layer from the tool as a film having first and second opposed major surfaces with nanofibrils formed on the first major surface, the nanofibrils have an average width of from 5 to 200 nm and an aspect ratio of at least 10, wherein the surface of the tool has a fluorocarbon release agent thereon, or the continuous layer comprises a fluorocarbon release agent, or both.

Methods according to the present invention are useful for preparing exotic surface structures that are useful, for example, for modifying wetting characteristics (e.g., increasing or decreasing wetting) of fluids on polymeric surfaces.

As used herein,

"anodize" refers to anodic oxidation;

"fluorocarbon" refers to any organic species containing at least four —$CF_2$— groups; and "separating the continuous layer from the tool as a film" refers to a process in which the tool remains substantially intact (e.g., is not dissolved).

DETAILED DESCRIPTION

Figure 1:
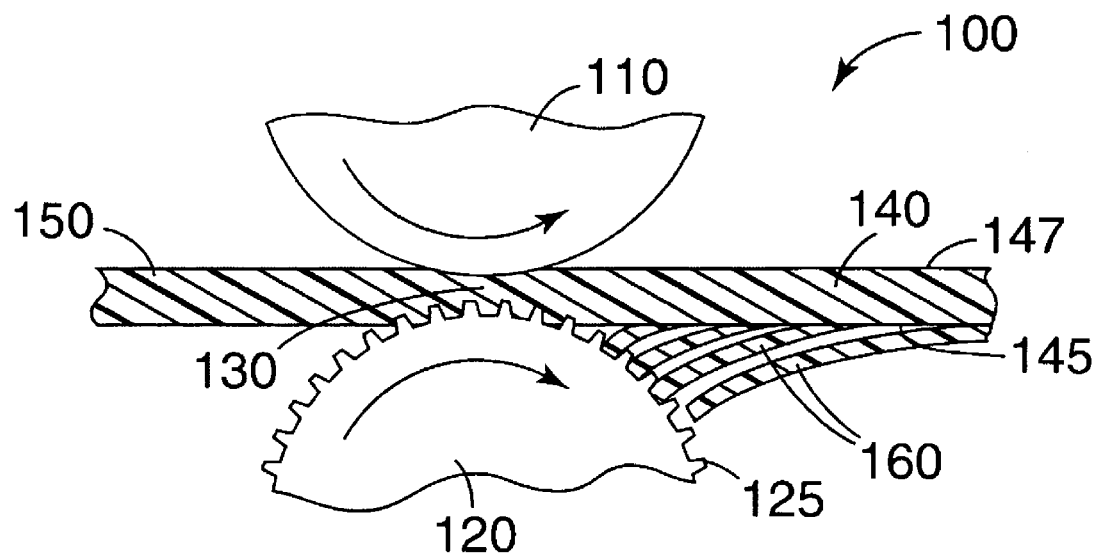
FIG. 1 is a simplified schematic representation of an exemplary method according to the present invention.

As used herein, the term "aluminum" refers to aluminum and alloys of aluminum in which a majority by weight of the alloy is aluminum. Examples of other metals which may be present in such aluminum alloys are silicon, magnesium, bismuth, copper, nickel, zinc, chromium, lead, iron, titanium, and manganese.

The tool has a porous surface (characterized by a network of pores) that is formed directly or indirectly by anodizing aluminum. For example, if the surface of the tool is aluminum, the porous surface may be formed directly by anodizing the surface of the tool.

In one indirect method, a sacrificial metal (e.g., copper) may be electroformed onto the anodized aluminum surface such that it forms a metal plate or foil with the inverse surface structure of the anodized aluminum. Subsequently the aluminum is dissolved, for example, by aqueous alkali, to leave the sacrificial metal plate or foil. Next, the desired metal (e.g., nickel) is electroformed on the textured surface (i.e., that surface having the inverse surface structure of the anodized aluminum) of the sacrificial metal plate or foil original anodized surface, followed by dissolving the sacrificial metal with a suitable etchant. Of course, other methods of replicating the anodized aluminum surface onto another metallic substrate may also be used.

Conditions for anodizing aluminum are well known in the art, and generally involve applying a positive voltage to an aluminum workpiece in the presence of an appropriate oxidant such as, for example, sulfuric acid, oxalic acid, choric acid, boric acid, sulfonic acid, or the like. Further details of exemplary aluminum anodizing processes may be found in reference works such as, for example, the *Aluminum Finishes Process Manual*: Reynolds Metal Company, Richmond, Va, © 1973, pages 62-113.

While the precise surface features may be varied depending on the anodizing conditions used, useful anodized aluminum surfaces have an average pore depth of from about 0.1 to about 5 micrometers, and average pore widths in a range of from about 10 to about 500 nanometers.

The tool may have any form suitable for embossing or solvent casting a film, including, for example, a roll, plate, belt, or sleeve.

A continuous layer of thermoplastic polymer is formed on a portion of the porous surface of the tool such that the thermoplastic polymer fills the pores in that portion of the surface. The thermoplastic polymer may spontaneously flow into the pores, for example, if dissolved or dispersed in a solvent. In some cases, the thermoplastic polymer may be forced into the pores, by pressure, heat, or a combination of the two.

The thermoplastic polymer should be selected such that it is not so sticky or brittle that it leaves material in the pores upon separation of the film from the tool. Useful thermoplastic polymers include cellulose esters (e.g., cellulose acetate, cellulose butyrate), poly alpha-olefins (e.g., polyethylene, polypropylene, and ethylene-propylene copolymers), and combinations thereof.

The thermoplastic polymer may include additives such as stabilizers, anti-oxidants, fragrances, colorants, and the like, but conventional fillers should typically be avoided as their size interferes with formation of the nanofibrils.

Using these thermoplastic polymers it is possible under normal conditions to obtain nanofibrils having an average width of from 10 to 200 nanometers and an aspect ratio of at least 10, 20, 30, 50, or more.

Further, the density of the nanofibrils typically ranges from about 1 to about 500 per square micrometer, although higher and lower densities may also be obtained. In some embodiments, the nanofibrils are discrete and continuously extend away from the first surface of the film. In other embodiments, the nanofibrils are bonded to one another at points where they contact each other, and are generally disposed parallel to the first surface of the film.

In order to obtain a clean release of the continuous layer from the porous surface of the tool, it is generally necessary to use a fluorinated organic release agent.

In some embodiments, the surface of the tool may be treated with a fluorocarbon release agent. In some embodiments, fluorocarbon release agents are characterized by a polar group that bonds to the metal surface and a fluorinated segment having at least four —$CF_2$— groups (e.g., —$CF_2CF_2CF_2CF_2$— or —$CF_2CF_2OCF_2CF_2$—). Examples of useful fluorocarbon release agents include fluorocarbons having the trade designation "FLUORAD" (e.g., "3M FLUORAD SURFACE MODIFIER") marketed by 3M Company, St. Paul, Minn.; fluorochemical trichlorosilanes, and fluorochemical monophosphates, for example, as described in U.S. Pat. Publ. No. 20040043146 (Pellerite et al.); and fluorocarbon benzotriazoles as described in U.S. Pat. No. 6,376,065 (Korba et al.); the disclosures of which are incorporated herein by reference. The fluorocarbon release agent may be applied to the porous surface, for example, as a solution or a vapor. Typically, the mold release is applied in sufficient quantity as to achieve at least monolayer coverage of the porous surface.

In some embodiments, a fluorocarbon melt additive may be combined with the thermoplastic polymer, such that the continuous layer comprises both thermoplastic polymer and the fluorocarbon melt additive. Suitable fluorocarbon release materials that may be combined with the thermoplastic polymer include, for example, fluorochemical oxazolidinones as described, for example, in U.S. Pat. No. 5,025,052 (Crater et al.) and U.S. Pat. No. 5,099,026 (Crater et al.); fluoroaliphatic group-containing non-ionic compounds as described, for example, in U.S. Pat. No. 5,244,951 (Gardiner) and U.S. Pat. No. 5,300,357 (Gardiner); fluorochemical aminoalcohols as described, for example, in U.S. Pat. No. 5,380,778 (Buckanin); fluorochemical piperazine compounds as described, for example, in U.S. Pat. No. 5,451,622 (Boardman et al.); fluorochemical and hydrocarbon surfactant blends as described, for example, in U.S. Pat. No. 5,804,625 (Temperante et al.); fluoroaliphatic compounds as described, for example, in U.S. Pat. No. 5,882,762 (Goeman), U.S. Pat. No. 6,127,485 (Klun et al.) and U.S. Pat. No. 6,262,180 (Klun et al.); fluorochemical oligomers as described, for example, in U.S. Pat. No. 6,174,964 (Jariwala et al.), U.S. Pat. No. 6,284,843 (Jariwala et al.), U.S. Pat. No. 6,288,157 (Jariwala et al.), U.S. Pat. No. 6,391,807 (Jariwala et al.) and U.S. Pat. No. 6,586,522 (Jariwala et al.); and fluoroaliphatic radical-containing surface-modifying additives as described, for example, in U.S. Pat. No. 6,380,289 (Thompson et al.); the disclosures of which are incorporated herein by reference. If used the level of fluorocarbon melt additives included with thermoplastic polymer in the continuous layer is typically in a level of from about 0.01 to about 10 percent based on the total weight of the continuous layer, although amounts outside this range may also be used.

Fluorocarbon release agents and fluorocarbon melt additives may be used individually or in combination.

The method of the present invention is better understood by reference to the Figures.

In one exemplary method shown in FIG. 1, a film is embossed to generate nanofibrils. Referring now to FIG. 1, in exemplary method 100 thermoplastic polymer film 150 is passed between backup roll 110 and tool 120. Tool 120 has porous surface 125 formed by anodic oxidation. As polymer film 150 is squeezed between backup roll 110 and tool 120, it forms continuous layer 130 such that continuous layer 130 extends into the pores of the surface 125. Upon emergence from roll 110 and tool 120, film 140 is formed. Film 140 has first and second opposed major surfaces 145 and 147, respectively. As film 140 separates from porous surface 125, nanofibrils 160 are formed that extend between porous surface 125 and first major surface 145. During formation nanofibrils 160 stretch in length until they finally are released from porous surface 125.

Typically, during such an embossing method, the thermoplastic polymer film should be heated to a temperature above the glass transition temperature of the thermoplastic polymer immediately prior to embossing.

Figure 2:
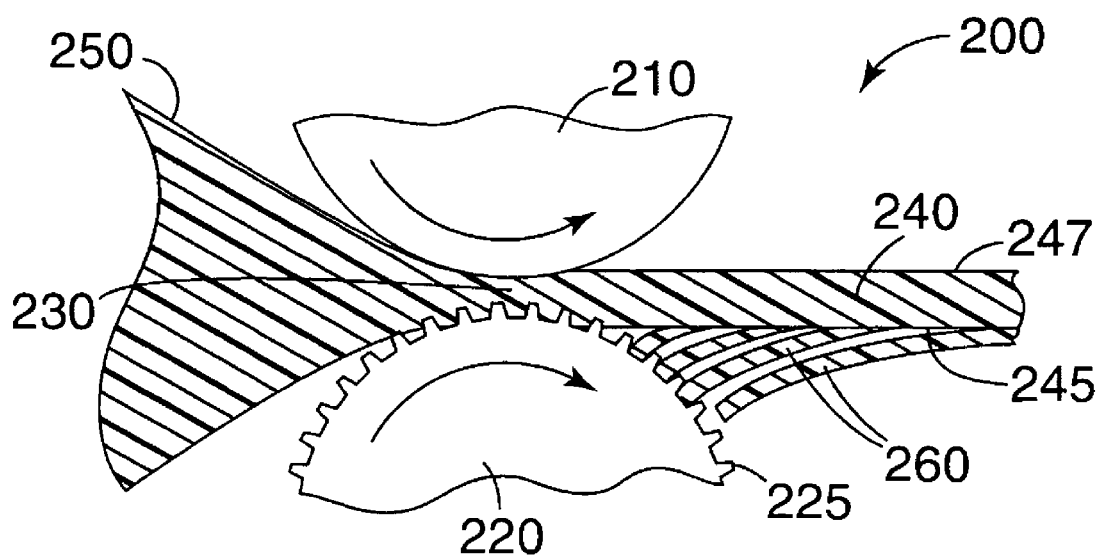
FIG. 2 is a simplified schematic representation of another exemplary method according to the present invention.

In another exemplary method 200 shown in FIG. 2, molten thermoplastic polymer 250 is passed between backup roll 210 and tool 220. Tool 220 has porous surface 225 formed by anodic oxidation. As molten polymer 250 is squeezed between backup roll 210 and tool 220, it forms continuous layer 230 such that continuous layer 230 extends into the pores of surface 225. Upon emergence from roll 210 and tool 220, molten polymer 250 is sufficiently cooled that polymer film 240 is formed. Film 240 has first and second opposed major surfaces 245 and 247, respectively. As film 240 separates from porous surface 225, nanofibrils 260 are formed that extend between porous surface 225 and first major surface 245. During formation nanofibrils 260 stretch in length until they finally are released from porous surface 225.

The continuous film may also be formed by casting a solution of thermoplastic polymer onto a continuous belt or plate, removing the solvent, e.g., by evaporation, and separating the continuous film from the tool to form a film having nanofibrils.

While various peel angles may be used when separating the thermoplastic film from the tool, it has been found that peel angles of about 90 degrees reliably yield fibrils having high aspect ratio while still releasing from the porous surface, however other peel angles may also be used. In general, the peel rate should be adjusted to a sufficiently slow speed such that thermoplastic polymer does not remain in the pores of the tool. While wishing not to be bound by theory, the choice of peel rate is not believed to be important, as long as thermoplastic polymer does not remain in the pores of the tool.

The output thermoplastic polymer film may have any thickness, width, and length. The film may be converted into strips, sheets, rolls, and the like.

Methods according to the present invention may be practiced in step-wise or continuous manner.

Films made according to the present invention have unique features that make them useful as substrates for display graphics, and in some cases for protective films.

Objects and advantages of this invention are further illustrated by the following non-limiting examples, but the particular materials and amounts thereof recited in these examples, as well as other conditions and, details, should not be construed to unduly limit this invention.

EXAMPLES

Unless otherwise noted, all parts, percentages, ratios, etc. In the examples and the rest of the specification are by weight, and all reagents used in the examples were obtained, or are available, from general chemical suppliers such as, for example, Sigma-Aldrich Company, Saint Louis, Mo., or may be synthesized by conventional methods.

Contact angles reported in the following examples were determined using deionized water at a temperature of 72° F. (22° C.).

Example 1

A piece of aluminum plate of dimensions 305 mm by 305 mm by 0.76 mm (composed of aluminum 1100 alloy and obtained from McMaster-Carr, Inc., Chicago Ill.) was cleaned using acetone and a paper towel to remove surface contaminants. The plate was placed in a tank containing 13 percent by weight of phosphoric acid and anodized in this solution at a temperature of 68° F. (20° C.) at a 60-volt electrical potential for 21.5 hours. The resulting anodized plate was removed from the tank, rinsed with deionized water and dried with compressed air.

The anodized aluminum plate was then used as a template for replication by nickel electroforming as follows. In a polypropylene tank an electroforming solution was prepared that consisted of 600 g/L of nickel sulfamate, 30 g/L of boric acid and 0.3 g/L of lauryl sodium sulfate. The anodized aluminum plate was placed in the electroforming solution, and electroforming proceeded at 140° F. (60° C.) at a current density of 20 amp/ft$^2$ (215.3 amp/m$^2$) for 20 hours. The nickel deposited on the anodized aluminum plate had an average thickness of 0.508 mm. A 5 molar solution of sodium hydroxide was prepared and heated to 180° F. (82° C.). The anodized aluminum plate with the deposited nickel was then dipped in the sodium hydroxide solution until the nickel surface appeared completely black.

Figure 3:
FIG. 3 is a scanning electron micrograph of the nickel surface of Example 1, corresponding to the inverse image of an anodized aluminum film.

The surface of the resulting nickel structure was examined with a scanning electron microscope (SEM) at a magnification of 80,000×, as shown in FIG. 3. The SEM showed that the aluminum had been completely dissolved, and that what remained was a nickel surface with nanostructures ranging in diameter from 10 to 230 nm.

Example 2

An anodized aluminum plate was prepared as in the first part of Example 1. A benzotriazole fluorochemical ester (0.1 percent by weight ester of benzotriazole-5-carbonxylic acid and 1H, 1H, 2H, 2H-perfluorododecyl alcohol, made by 3M Company, St. Paul, Minn. and disclosed in U.S. Pat. No. 6,376,065 (Korba et al.)) was used as a release agent. The release agent was applied as follows. A piece of filter paper (available from Whatman International, Ltd., Maidstone, England), having about the same dimensions as the anodized aluminum plate, was dipped into a tray containing the release agent until it was saturated and then positioned on top of the plate. The plate and filter paper were then placed in an oven set to a temperature of 120° C. After 30 minutes the plate and filter paper were removed from the oven, the filter paper was lifted from the top of the plate and the plate was allowed to cool to room temperature.

Figure 4:
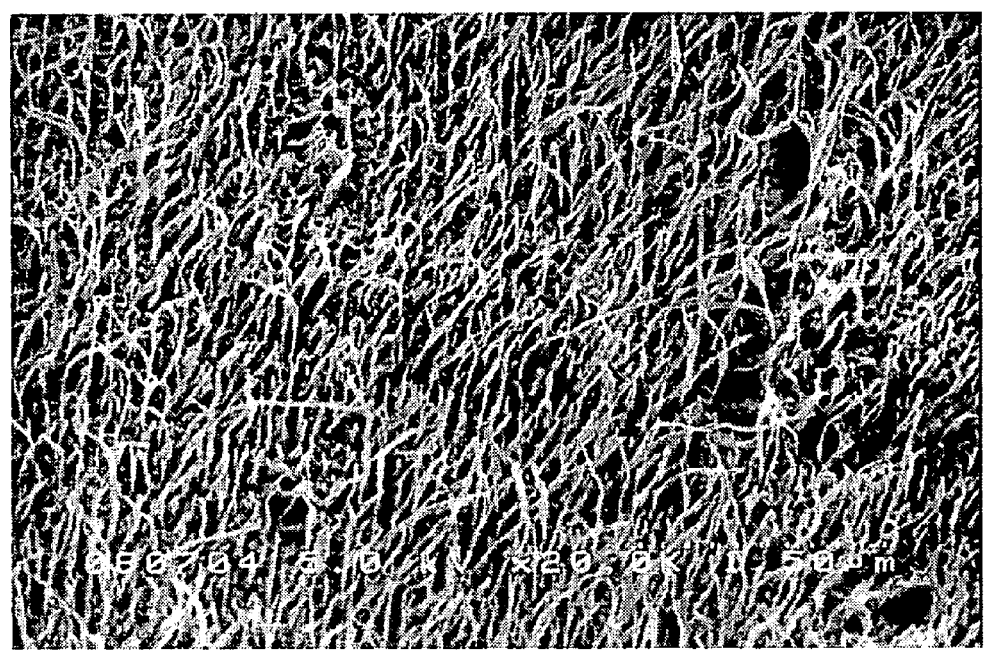
FIG. 4 is a scanning electron micrograph of an exemplary nanostructured polymeric film made according to one embodiment of the present invention Example 2.

A sheet of cellulose acetate (CAS No. 9004-35-7, available from SPI Supplies Division, West Chester, Pa.), 25 micrometers in thickness, was placed on the anodized aluminum plate. Four drops of acetone were distributed on the surface of the cellulose acetate film using a 5 ¾ inch (14.6 cm) Pasteur pipette (available from VWR International, West Chester, Pa.), thereby dissolving the film and allowing the cellulose acetate to flow into the porous anodized aluminum surface of the plate. After the acetone evaporated, the thin cellulose acetate film that remained was removed from the plate by peeling. First, the film was freed from the edges of the plate by lifting a corner of the film with tweezers, and pulling the film normal to the plate until the entire film released from the plate. Viewed via SEM at a magnification of 20,000×, as shown in FIG. 4, nanostructures were observed having aspect ratios ranging from about 10 to about 50.

Contact angles were measured for both the nanostructured cellulose acetate film of this example and a comparable unstructured cellulose acetate film. A goniometer obtained under the trade designation "MODEL A-100 GONIOMETER" from Ramé-Hart, Inc., Mountain Lakes, N.J., was used for the measurements. Both advancing and receding contact angles with deionized water were measured. For the nanostructured film of this example, the advancing angle was 61° and the receding angle was 0°. For a comparable unstructured cellulose acetate film, the advancing angle was 61° and the receding angle was 27°.

Example 3

Figure 5:
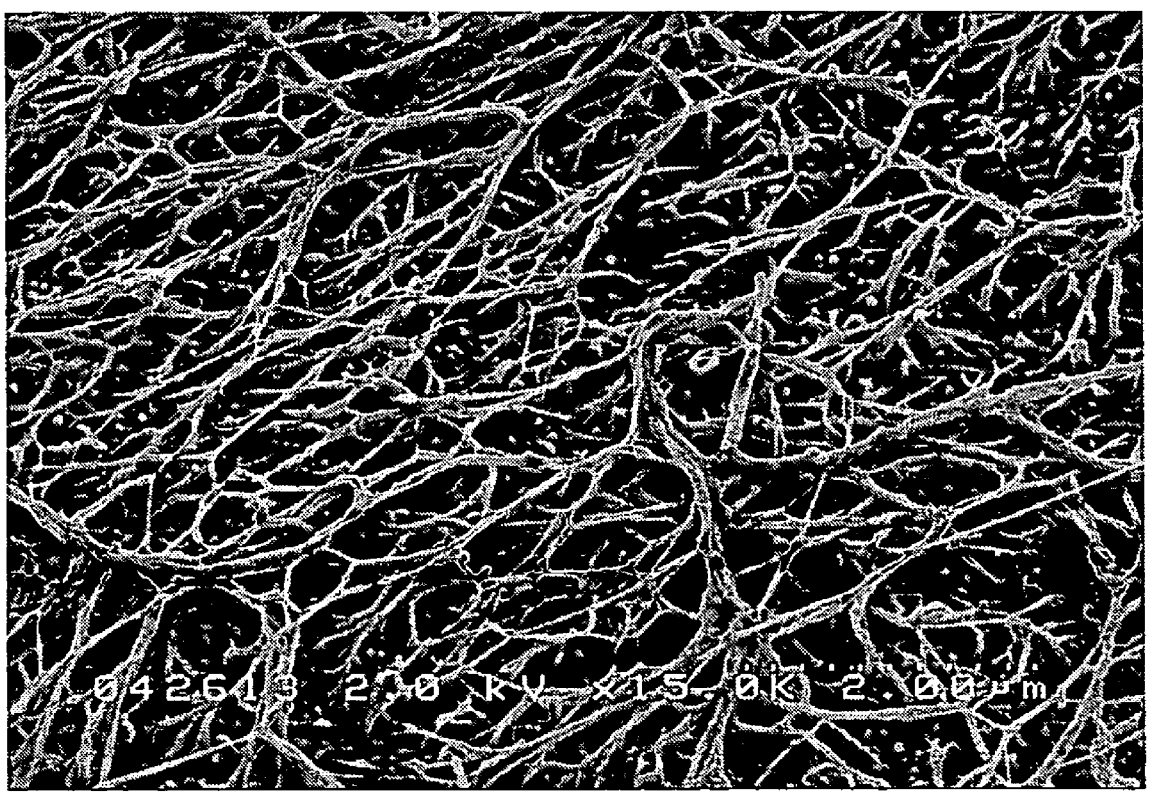
FIG. 5 is a scanning electron micrograph of an exemplary nanostructured polymeric film made according to one embodiment of the present invention Example 3.

An anodized aluminum plate was prepared as in the first part of Example 1, except that the electrical potential for anodizing was 70 volts and the time was 15 minutes. A polypropylene (available as PP3445 from Exxon Mobil Corporation, Irving Tex.) was combined with 1 percent of a fluorochemical additive (trade designation "FC1801", obtained from 3M Corporation, St. Paul, Minn.) to make pellets. The pellets were formed into a film using thermal compression molding. The film was then embossed using the anodized aluminum plate as an embossing tool. A Wabash Compression Molding Machine, Model V75H-24-CLX (available from Wabash MPI, Wabash, Ind.) was used both to form the film and to emboss it. The film was embossed by applying a pressure of 1600 psi (11.03 MPa), at a temperature of 190° C. for 3 minutes. When the embossed film had cooled to about 70° C., it was separated from the embossing tool as in Example 2. An SEM photomicrograph at a magnification of 15,000, shown in FIG. 5 of the resulting embossed surface structure in the polypropylene film.

Contact angles were measured as in Example 2. For the embossed polypropylene film of this example, using deionized water, the advancing contact angle was 167° and the receding angle was 125°. For a comparable polypropylene film without the embossed nanostructure, the advancing contact angle was 104° and the receding angle was 78°.

Various modifications and alterations of this invention may be made by those skilled in the art without departing from the scope and spirit of this invention, and it should be understood that this invention is not to be unduly limited to the illustrative embodiments set forth herein.

What is claimed is:

1. A method of making nanostructured polymeric film comprising:
providing a tool having a porous anodized aluminum surface or a metallic replica thereof, wherein the average depth of the pores is in a range of from about 0.1 micrometer to about 5 micrometers and the average pore width is in a range of from about 10 to about 500 nanometers;
forming a continuous layer of thermoplastic polymer on at least a portion of the surface of the tool such that the continuous layer extends into the pores of the porous surface, wherein the thermoplastic polymer is selected from cellulose esters, poly alpha-olefins, and combinations thereof; and
separating the continuous layer from the tool as a film having first and second opposed major surfaces with nanofibrils formed on the first major surface, wherein during formation of the nanofibrils they extend from the first major surface to the porous surface and are stretched in length until they finally are released from the porous surface, the nanofibrils having an average width of from 5 to 200 nm and an aspect ratio of at least 10, wherein the nanofibrils are bonded to one another at points where they contact each other, and are generally disposed parallel to the first surface of the film, and wherein the continuous layer comprises a fluorocarbon melt additive.

2. A method according to claim 1, wherein the thermoplastic polymer is selected from the group consisting of cellulose acetate, polyethylene and polypropylene.

3. A method according to claim 1, wherein the continuous layer is formed by extrusion of molten thermoplastic polymer.

4. A method according to claim 1, wherein the layer of polymeric material comprises a thermoplastic polymeric film.

5. A method according to claim 1, wherein the surface of the tool has a fluorocarbon release agent thereon.

6. A method according to claim 1, wherein the tool comprises a metal roll.

7. A method according to claim 1, wherein the surface of the tool has a fluorocarbon release agent thereon, and wherein the fluorocarbon release agent comprises a benzotriazole.

8. A method according to claim 1, wherein the surface of the tool comprises anodized aluminum.

* * * * *

UNITED STATES PATENT AND TRADEMARK OFFICE
CERTIFICATE OF CORRECTION

Page 1 of 1

PATENT NO. : 7,906,057 B2
APPLICATION NO. : 11/181153
DATED : March 15, 2011
INVENTOR(S) : Haiyan Zhang It is certified that error appears in the above-identified patent and that said Letters Patent is hereby corrected as shown below:

Column 4
Line 6, delete ".between" and insert -- between --, therefor.

Line 63, delete "In" and insert -- in --, therefor.

Column 7
Line 6, In Claim 1, delete "arc" and insert -- are --, therefor.

Signed and Sealed this
Twenty-first Day of June, 2011

David J. Kappos
*Director of the United States Patent and Trademark Office*